(12) United States Patent
Karlgaard et al.

(10) Patent No.: US 11,778,583 B2
(45) Date of Patent: Oct. 3, 2023

(54) AUTONOMOUS GEOGRAPHICAL LOCATION DETERMINATION USING MESH NETWORK

(71) Applicant: Landis+Gyr Innovations, Inc., Alpharetta, GA (US)

(72) Inventors: Matthew Karlgaard, Brainerd, MN (US); John Radgowski, Midlothian, VA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 35 days.

(21) Appl. No.: 17/218,359

(22) Filed: Mar. 31, 2021

(65) Prior Publication Data

US 2022/0322276 A1 Oct. 6, 2022

(51) Int. Cl.
| | |
|---|---|
| *H04W 64/00* | (2009.01) |
| *G01S 5/02* | (2010.01) |
| *G01S 5/14* | (2006.01) |
| *H04W 84/18* | (2009.01) |

(52) U.S. Cl.
CPC ......... *H04W 64/003* (2013.01); *G01S 5/0244* (2020.05); *G01S 5/02213* (2020.05); *G01S 5/14* (2013.01); *H04W 84/18* (2013.01)

(58) Field of Classification Search
CPC ..... H04W 64/003; G01S 5/02213; G01S 5/14
See application file for complete search history.

(56) References Cited

U.S. PATENT DOCUMENTS

| | | | |
|---|---|---|---|
| 2014/0018111 A1 | 1/2014 | Farley et al. | |
| 2015/0154546 A1* | 6/2015 | Skaaksrud | H04W 12/08 |
| | | | 705/333 |
| 2017/0244444 A1* | 8/2017 | Bruemmer | H04W 64/00 |
| 2019/0069263 A1 | 2/2019 | Ylamurto et al. | |

FOREIGN PATENT DOCUMENTS

EP 2497310 9/2012

OTHER PUBLICATIONS

International Application No. PCT/US2022/022364, International Search Report and the Written Opinion dated Jul. 1, 2022, 14 pages.

* cited by examiner

*Primary Examiner* — Muthuswamy G Manoharan
(74) *Attorney, Agent, or Firm* — Kilpatrick Townsend & Stockton LLP

(57) ABSTRACT

Technologies for autonomously determining location information of a network node in a mesh network are provided. For example, a mesh network includes primary nodes whose locations are known and secondary nodes whose locations are to be determined. A secondary node is configured to identify in-range primary nodes among the primary nodes that are in the communication range of the secondary node, and determine whether the number of the in-range primary nodes is above a threshold. If the number of the in-range primary nodes is above the threshold, the secondary node further determines a distance between the secondary node and each of selected in-range primary nodes, and calculates a location of the secondary node based on the distances and the respective locations of the selected in-range primary nodes. The secondary node further transmits the calculated location to a headend system over the mesh network.

18 Claims, 5 Drawing Sheets

AUTONOMOUS GEOGRAPHICAL LOCATION DETERMINATION USING MESH NETWORK

TECHNICAL FIELD

This disclosure generally relates to mesh networks and more particularly relates to the determination of the geographical location information of network nodes in the mesh network.

BACKGROUND

Geographical location information of nodes in a mesh network can be useful, for example, to determine or verify the topology of a resource distribution network associated with the mesh network or to quickly locate issues within the distribution network. The location information of the nodes can be determined using sources such as the GPS chips or Wi-Fi components installed on the nodes. However, the majority of the network nodes are not equipped with these types of location-determining components. The locations of the majority of network nodes are typically manually tracked or not tracked. For large networks, the number of network nodes can be as high as a few million, rendering this manual process time-consuming and error-prone. In addition, the location of the network nodes may change from time to time. For example, meters in the distribution network may be moved after installation due to ongoing residential and commercial construction, demolition or renovation, utility equipment upgrades, and so on. This poses more challenges to the manual tracking of the locations of the network nodes.

SUMMARY

Aspects and examples are disclosed for apparatuses and processes for autonomously determining geographical location information of nodes in a mesh network. In one example, a system for determining a geographical location of a node in a wireless mesh network includes a plurality of nodes communicatively connected through a wireless mesh network. The plurality of nodes comprise a group of primary nodes whose geographical location are known and a group of secondary nodes whose geographical locations are to be determined. A secondary node in the group of secondary nodes is configured to perform operations that include identifying in-range primary nodes for the secondary node among the group of primary nodes that are in a communication range of the secondary node, and determining that a number of the in-range primary nodes is above a threshold. The operations further include in response to determining that a number of the in-range primary nodes is above the threshold, determining a physical distance between the secondary node and each of at least three in-range primary nodes, calculating a geographical location of the secondary node based on the physical distances between the secondary node and the at least three in-range primary nodes and the respective geographical locations of the at least three in-range primary nodes; and, transmitting data specifying the calculated geographical location to a headend system over the wireless mesh network.

In another example, a method performed by a node in a wireless mesh network for determining a geographical location of the node includes determining in-range primary nodes for the node that are in a communication range of the node. The geographical locations of the in-range primary nodes are known. The method further includes receiving respective location information of the in-range primary nodes from the corresponding in-range primary nodes, the location information specifying the respective geographical locations of the in-range primary nodes, and determining that a number of the in-range primary nodes is above a threshold. The method also includes in response to determining that a number of the in-range primary nodes is above a threshold, determining a physical distance between the node and each of at least three in-range primary nodes, calculating a geographical location of the node based on the physical distances between the node and the at least three in-range primary nodes and the respective geographical locations of the at least three in-range primary nodes, and transmitting data specifying the calculated geographical location to a headend system over the wireless mesh network.

In yet another example, a node in a wireless mesh network includes a processor configured to execute computer-readable instructions, and a memory configured to store the computer-readable instructions that, when executed by the processor, cause the processor to perform operations that include determining in-range primary nodes for the node that are in a communication range of the node. The geographical locations of the in-range primary nodes are known. The operations further include receiving respective location information of the in-range primary nodes from the corresponding in-range primary nodes, the location information specifying the respective geographical locations of the in-range primary nodes and determining that a number of the in-range primary nodes is above a threshold. The operations also include, in response to determining that a number of the in-range primary nodes is above a threshold, determining a physical distance between the node and each of at least three in-range primary nodes, calculating a geographical location of the node based on the physical distances between the node and the at least three in-range primary nodes and the respective geographical locations of the at least three in-range primary nodes, and transmitting data specifying the calculated geographical location to a headend system over the wireless mesh network.

These illustrative aspects and features are mentioned not to limit or define the presently described subject matter, but to provide examples to aid understanding of the concepts described in this application. Other aspects, advantages, and features of the presently described subject matter will become apparent after a review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
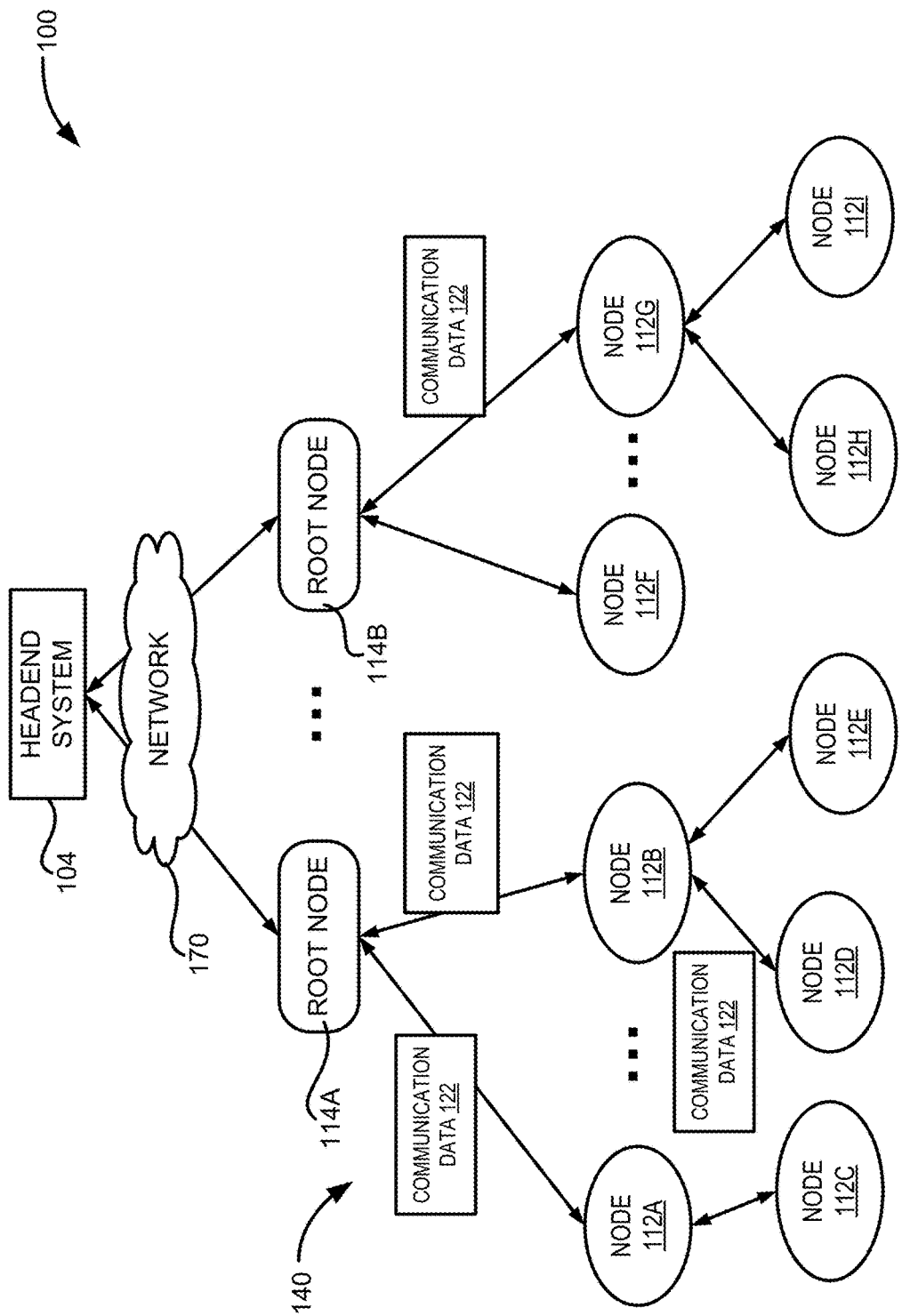
FIG. 1 is a block diagram showing an illustrative operating environment for autonomously determining geographical location information of nodes in a mesh network, according to certain aspects of the present disclosure.

Systems and methods are provided for autonomously determining geographical location information of nodes in a mesh network. For example, a secondary node whose location is to be determined communicates with its neighboring nodes to identify primary nodes whose locations are known. When the number of identified primary nodes meets the required number of primary nodes, the secondary node calculates its distance to each of these primary nodes. Using the location information of the primary nodes and calculated distance information, the secondary node is able to calculate its location. The secondary node can in turn serve as a primary node for its neighboring secondary nodes to determine their respective locations. The secondary nodes can transmit the determined location information to a headend system over the mesh network to have the location information recorded.

The following non-limiting example is provided to introduce certain embodiments. In this example, a mesh network includes a group of nodes whose locations are known, referred to as primary nodes, and a group of nodes whose locations are to be determined, referred to as secondary nodes. Each primary node has one or more location sources used to determine its location. The location sources include, for example, a GPS chip installed on the primary node, a Wi-Fi component installed on the primary node, a cellular module of the primary node, an address that can be converted to a location, or a location determined using other primary nodes. The location of the primary node also has an accuracy associated therewith to indicate how accurate the location is. To determine the location of a secondary node, the secondary node can communicate with neighboring nodes within its communication range to identify the primary nodes among them, referred to as in-range primary nodes. If there are a sufficient number of in-range primary nodes, the secondary node can start the location determination process. The sufficient number of the in-range primary nodes is determined based on the method used to determine the location. For instance, if the triangulation method is used, three in-range primary nodes are sufficient to determine the location of the secondary node.

Continuing this example, the secondary node further selects reference nodes from these in-range primary nodes if there are more than a sufficient number of in-range primary nodes. The selection can be performed based on the accuracies of the locations of these in-range primary nodes. In examples, the in-range primary nodes with the highest accuracies are selected. The secondary node then calculates its distance to each of the in-range primary nodes that are selected for the location determination process. The distance can be determined using various methods, such as the time-of-flight method or a signal-strength-based method. The secondary node further determines the accuracy for each of the calculated distances. The distances and the locations of the selected in-range primary nodes can then be utilized to calculate the location of the secondary node, for example, using the triangulation method. The secondary node further calculates the accuracy of the calculated location using, for example, the location accuracies of in-range primary nodes and the accuracies of its distance to each of the in-range primary nodes. The secondary node can then send the determined location information, including the calculated location and location accuracy, to the headend system.

Techniques described in the present disclosure increase the efficiency and accuracy of the geographical location determination for nodes in a mesh network. By configuring the individual network nodes to communicate with neighboring nodes to determine their respective geographic locations based on the locations of the neighboring nodes, the locations of these individual nodes which were unknown, outdated, or otherwise incorrectly recorded, can be determined, updated, or corrected. In addition, the determination of the location of individual network nodes is performed locally and does not involve the communication with the headend system of the mesh network, thereby significantly reducing the communication bandwidth requirement to the headend system. Compared with the traditional location determination approaches, the process proposed herein can be carried out automatically and periodically without human intervention. Consequently, a more accurate and up-to-date location determination of the network nodes can be achieved.

Exemplary Operating Environment

FIG. 1 shows an illustrative operating environment 100 for autonomously determining geographical location information of network nodes in a mesh network, according to certain aspects of the present disclosure. The environment 100 includes a mesh network 140 which includes multiple network nodes 112A-112I, which may be referred to herein individually as a network node 112 (or a node 112 in short) or collectively as the network nodes 112 (or nodes 112 in short). A network node 112 can be any device on the mesh network 140 that contains a radio. For example, the network nodes 112 may include measuring nodes for collecting data from the respective deployed location of the nodes, processing nodes for processing data available to the nodes, router nodes for forwarding data received from one node to another node in the mesh network 140, or nodes that are configured to perform a combination of these functions. The nodes 112 are further configured to communicate with each other so that messages or data can be exchanged between the nodes 112.

In one example, the mesh network 140 can be associated with a resource distribution network, such as a utility network, to deliver measurement data obtained in the resource distribution network. In this example, the nodes 112 can include meters deployed at various geographical locations of the customer premises through the resource distribution network, such as electricity meters, gas meters, water meters, steam meters, etc., and be implemented to measure various operating characteristics of the resource distribution network. In the example of power distribution network, example characteristics include, but are not limited to, average or total power consumption, the peak voltage of the electrical signal, power surges, and load changes. The nodes 112 can also include other types of network nodes such as load control switches that monitor energy usage and automatically switch off high-usage equipment when the energy demand spikes.

The network nodes 112 can transmit communication data 122 for the collected or generated data and other data through the mesh network 140 to root nodes 114A or 114B (which may be referred to herein individually as a root node 114 or collectively as the root nodes 114). A root node 114 is one type of network node. Root nodes 114 of the mesh network 140 may be configured for communicating with the nodes 112 to perform operations such as managing the nodes 112, collecting data from the nodes 112, and forwarding data to a headend system 104. A root node 114 can also be configured to function as a node to measure and process data itself. The root nodes 114 may be personal area network (PAN) coordinators, gateways, or any other devices capable of communicating with the headend system 104.

The root nodes 114 ultimately transmit the generated and collected data to the headend system 104 via another network 170 such as the Internet, an intranet, or any other data communication network. The headend system 104 can function as a central processing system that receives streams of data or messages from the root nodes 114. The headend system 104, or another system associated with the utility company, can process or analyze the collected data for various purposes, such as billing, performance analysis, or troubleshooting. In examples, the communication data 122 transmitted from individual network nodes 112 may include the location information and the accuracy of the location determined by the individual nodes 112. In that case, the headend system 104 or another system configured to maintain the location information can update the location information based on the received communication data 122. As used herein, the term headend system 104 may be used to collectively refer to the headend system and other systems upstream from the headend system, such as the system configured to maintain the location information. The determined location information can be used to determine or verify the topology of the resource distribution network associated with the mesh network. The location information can also be used for troubleshooting (e.g., to locate meters or other devices on the resource distribution network when there are issues within the distribution network), load balancing, outage reporting, and so on.

It should be appreciated that while FIG. 1 depicts a specific network topology (e.g., a DODAG tree), other network topologies are also possible (e.g., a ring topology, a mesh topology, a star topology, etc.). In addition, although the following description will focus on the aspects of a group of nodes 112, the technologies described herein can be applied by any node in the mesh network, including the node 112 and the root node 114.

Figure 2:
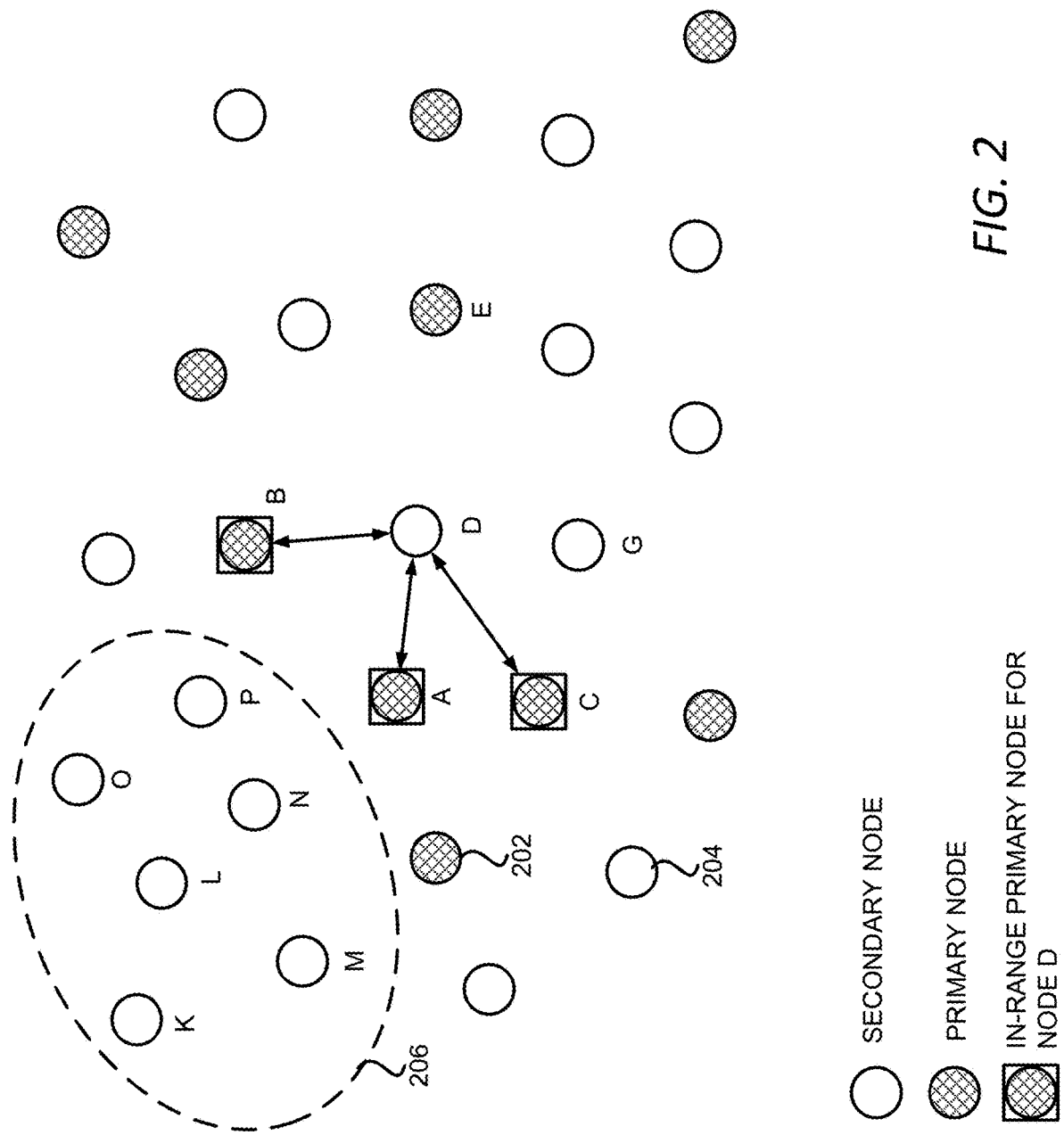
FIG. 2 shows an example of network nodes including primary nodes whose locations are known and secondary nodes whose locations are to be determined, according to certain aspects of the disclosure.

FIG. 2 shows an example of network nodes including primary nodes 202 and secondary nodes 204, according to certain aspects of the disclosure. A primary node 202 is a network node with at least one primary location source and thus has a known geographical location. In some examples, the geographical location (or "location" in short) is represented using a pair of latitude and longitude in the world geodetic system. The primary location source can be, for example, the location determined using a global positioning system (GPS) chip installed on the node. Some network nodes, such as routers, gateways, overhead line sensors, and some meters on the mesh network 140 may be equipped with a GPS chip. These network nodes can use the GPS chips to determine their respective location. However, if the network node equipped with the GPS is located in an indoor environment, the location determined by the GPS may have reduced accuracy. In that case, the network node may not serve as a primary node. The primary location source can also be a location determined through Wi-Fi positioning using the Wi-Fi module of the network node, or a location determined through the cellular modem installed on the network node through communicating with the cellular tower. These types of primary location sources are independent location sources that the network nodes can use to determine their respective locations without relying on the mesh network 140.

In some examples, the primary location sources can also include the location information converted from the addresses associated with the network nodes. For example, a network node may be associated with a physical address in the headend system 104, such as the street address of the premises where the network node is installed. The headend system 104 can convert the physical address to a geographical location and send the geographical location information to the network node. In this example, with the converted location information, the network node can be a primary node. In other examples, the primary location sources can include locations determined from existing primary nodes. For instance, the location information of a network node whose location was unknown, but later was determined from its neighboring primary nodes can be a primary location source. The network node can serve as a primary node after its location information is determined using the location information from the primary nodes. Other types of location information may be used as the primary location sources and the network nodes with those primary location sources can thus serve as primary network nodes.

Each of the primary location sources has an associated location accuracy. In some examples, the location accuracy is presented using a distance unit, such as ±100 feet. In general, the accuracies of the primary location sources discussed above can be ranked in the following order, from high to low, the location determined using a GPS chip (in an outdoor environment), the location determined using the Wi-Fi component, location determined using the cellular modem, address-converted location, and location calculated from primary nodes. In some scenarios, a primary node may have multiple primary location sources. For example, a network node may have a GPS chip, a Wi-Fi component, and an address-converted location. In such a scenario, the network node may choose the location source having the highest accuracy as its location or determine its location by combining these multiple location sources. For example, the location of the network node can be determined as a weighted average of these multiple location resources. The weighting factor for a location source can be determined as the inverse of the location accuracy of the location source divided by the sum of the inverses of location accuracies of the location sources. The accuracy of the determined location can be calculated based on the inverse of the sum of the inverses of the location accuracies.

A secondary node 204 is a node whose location information is to be determined. The secondary node 204 may be a node whose location is unknown or a node having inaccurate or out-of-date location information. As such, the secondary nodes may include network nodes whose locations have not been determined, network nodes whose locations have been determined but the accuracy of the determined location is low, or network nodes that may have been moved and whose locations are to be updated. As discussed above, some primary location sources may have low accuracies, such as the location determined by an indoor GPS. In those cases, a network node having such a low-accuracy primary location source is classified as a secondary node whose location is to be determined, unless it has other high-accuracy primary location sources.

A secondary node 204 can determine its location by communicating with multiple primary nodes. In some examples, the secondary node 204 can use the triangulation method to determine its location using the primary nodes as a basis. This method requires enough primary nodes within the communication range of the secondary node to enable the secondary node to determine its location. In the example shown in FIG. 2, the secondary node D has three primary nodes A, B, and C within its communication range, also referred to as in-range primary nodes for D. The secondary node D can use these three primary nodes as reference nodes to determine its location. For example, the secondary node D can communicate with these three in-range primary nodes to obtain their location information and to determine the distance between the secondary node D and each of the primary nodes A, B, and C. Based on the location information and the distance information, the secondary node D can use triangulation method to determine its location. In some examples, the secondary node calculates its location accuracy based on the location accuracy of the three in-range primary nodes. Additional details regarding determining the distance between the secondary node and the in-range primary nodes and the location of the secondary node are provided below with respect to FIG. 3. With the determined location, the secondary node can then be used as a primary node for other secondary nodes, such as secondary node G, for location determination.

Depending on the distribution of the primary nodes, some secondary nodes may have more than three in-range primary nodes. In the example shown in FIG. 2, assuming primary node E is also in the communication range of the secondary node D, the secondary node D thus has four in-range primary nodes A, B, C, and E. These four in-range primary nodes can all be the candidates for the reference nodes used to determine the location of node D. In one example, the secondary node D can select, among the four candidate nodes, three in-range primary nodes that have the highest location accuracies as the three reference nodes and determine the location of node D using the selected three reference nodes. In another example, the secondary node D generates different sets of three reference nodes from the candidate nodes. The secondary node D further determines a candidate location using each set of reference nodes and then combines the determined candidate locations to generate the location of the secondary node. The combination can be a weighted combination with weights generated according to the location accuracies of the reference nodes in each set. Additional details regarding selecting reference primary nodes and combining candidate locations of different sets of reference nodes are provided below with respect to FIG. 3.

As shown in FIG. 2, some secondary nodes may not have a sufficient number of in-range primary nodes to determine their locations. The number of in-range primary nodes is sufficient if it is three or more when the triangulation method is used. The sufficient number of in-range primary nodes may be different if other methods are used. In the example shown in FIG. 2, these secondary nodes include nodes K-P. In that case, these secondary nodes cannot use the primary nodes to determine their absolute locations. However, if these secondary nodes can communicate with other nodes, each secondary node can determine a relative location based on its distance from other nodes in the mesh network 140. As a result, a relative map showing the relative positions of a group 206 of secondary nodes (such as nodes K-P) can be generated. Once the secondary nodes in the relative map have a sufficient number of in-range primary nodes, the locations of the rest of the secondary nodes can be determined according to the relative map.

In some examples, a secondary node in a group 206 is configured to determine its relative position to other secondary nodes that are in its communication range. To generate the relative map for the group 206 of secondary nodes, individual secondary node can send their respective relative position information to the headend system 104 where the relative position information is combined to generate the relative map. Alternatively, or additionally, the relative position information from individual secondary nodes are sent to one or more network nodes 112 or 114 configured with more computing capabilities to generate the relative map for the group 206 by combining these relative position information.

Figure 3:
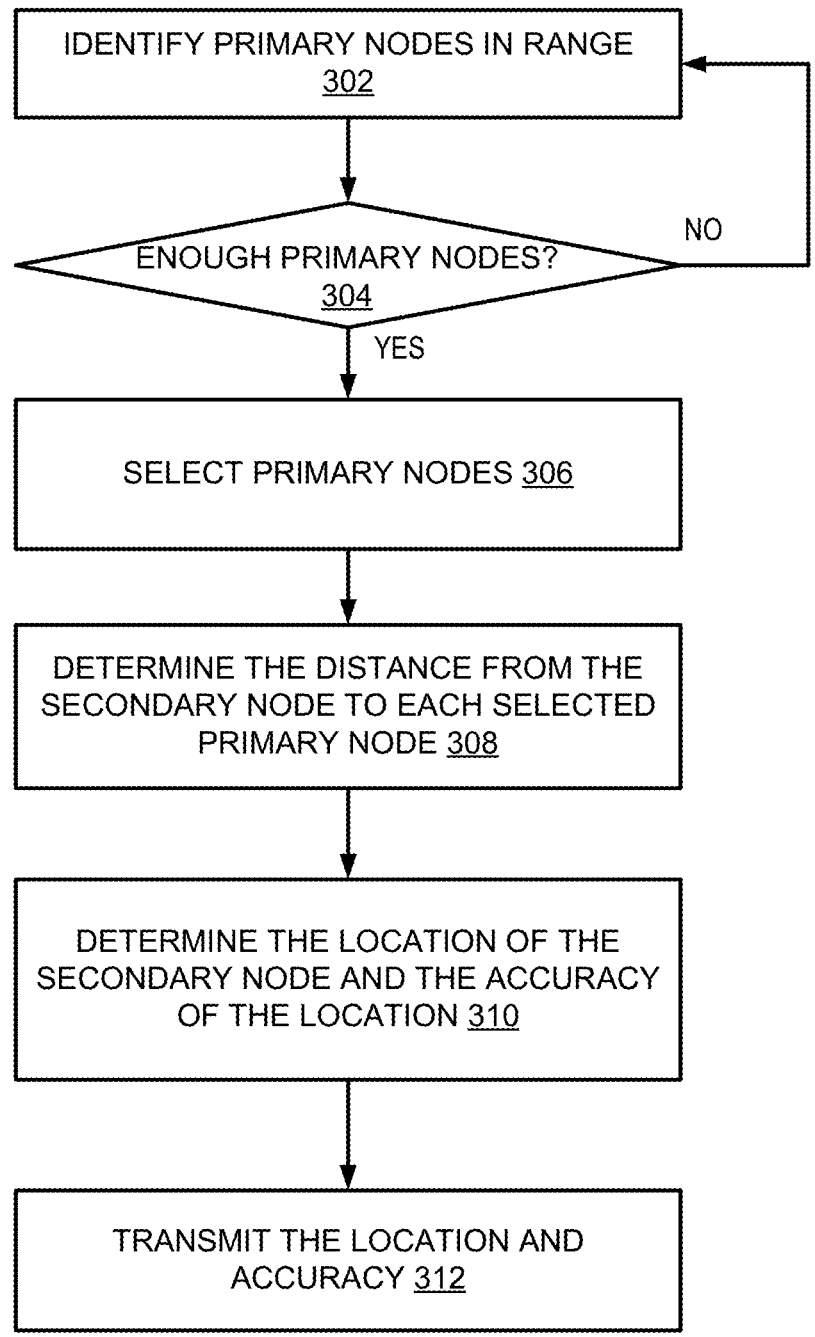
FIG. 3 shows an example of a process for autonomously determining geographical location information of a node in a mesh network, according to certain aspects of the disclosure.

Referring now to FIG. 3, FIG. 3 shows an example of a process 300 for autonomously determining geographical location information of a node in a mesh network, according to certain aspects of the disclosure. A secondary node 204 in the mesh network 140 can implement operations in process 300 by executing suitable program code. For illustrative purposes, the process 300 is described with reference to certain examples depicted in the figures. Other implementations, however, are possible.

At block 302, the process 300 involves the secondary node 204 identifying the primary nodes 202 within its communication range. In some examples, the secondary node 204 identifies a primary node 202 by communicating with a neighboring node requesting its location information. The location information can include, for example, the geographical location of the neighboring node, the associated location accuracy, and the location source of the neighboring node. If the neighboring node responds to the request by sending its location information, the secondary node 204 can identify this neighboring node as an in-range primary node. In further examples, the secondary node 204 identifies a neighboring node as an in-range primary node only if the location accuracy associated with the location of the neighboring node is higher than a pre-determined threshold or if the location source of the neighboring node is in a pre-determined list of primary sources. In alternative or additional examples, the neighboring node may, from time to time, send its location information during normal communications with the secondary node 204. In these examples, the secondary node 204 can obtain the location information of its neighboring nodes without proactively sending the requests, and can identify the in-range primary nodes from time to time. In some implementations, each network node is associated with a primary node identifier. The primary node identifiers of the primary nodes are set to be true and the primary node identifiers of the secondary nodes are set to be false. After a secondary node determines its geographical location with an accuracy higher than a pre-determined threshold, the primary node identifier of the secondary node can be set to true. In these implementations, the secondary node 204 can identify the in-range primary nodes by requesting and examining their respective primary node identifiers.

At block 304, the process 300 involves the secondary node 204 determining if there is a sufficient number of in-range primary nodes among its neighboring nodes, i.e., at least a minimum number of required in-range primary nodes have been identified. For example, if the triangulation method is used to determine the location of the secondary node 204, the minimum number of required in-range primary nodes is three. In this example, the secondary node 204 can determine that a sufficient number of in-range primary nodes have been identified if the number of in-range primary nodes of the secondary node 204 is three or more. If there is an insufficient number of in-range primary nodes, the secondary node 204 continues to identify more in-range primary nodes. For example, the secondary node 204 may resume its normal operations (e.g., collecting and transmitting data), and after a certain period of time, communicate with its neighboring to identify more in-range primary nodes.

If a sufficient number of in-range primary nodes have been identified, the process 300 involves, at block 306, the secondary node 204 selecting in-range primary nodes for location determination. The selection is performed when the number of in-range primary nodes is higher than the minimum required number (e.g., three in the triangulation method). As discussed above with regard to FIG. 2, the secondary node 204 can select, among the candidate in-range primary nodes, the required number of in-range primary nodes that have the highest location accuracies as the reference nodes used for determining the location of the secondary node 204. In other examples, the secondary node 204 selects the primary nodes according to their respective location sources.

In alternative or additional examples, the secondary node 204 generates different combinations of required reference nodes using the candidate in-range primary nodes. For example, if the number of candidate in-range primary nodes is N and the required number of in-range primary nodes is n, the secondary node 204 can generate $\binom{N}{n}$ different combinations (or candidate sets) of in-range primary nodes. For each candidate set of in-range primary nodes, the secondary node 204 can determine a candidate location using the in-range primary nodes in the set as reference nodes as discussed below with respect to blocks 308 and 310. The secondary node 204 can further combine the candidate locations to generate the location of the secondary node according to the accuracies of the respective candidate locations as discussed in detail below with respect to block 310.

At block 308, the process 300 involves the secondary node 204 determining its distance to each of the in-range primary nodes selected in block 306. If, at block 306, the secondary node 204 selects the required number of in-range primary nodes, the secondary node 204 calculates the distance to each of the selected required number of in-range primary nodes. If at block 306, the secondary node 204 decides to use more than the required number of in-range primary nodes as candidate nodes and to combine the locations generated using different sets of candidate in-range primary nodes, the secondary node 204 calculates its distance to each of the candidate in-range primary nodes at block 308. The distance between two nodes or the distance from one node to another node is a numerical measurement of how far apart these two nodes are in physical space. The distance is also referred to herein as "physical distance."

Figure 4:
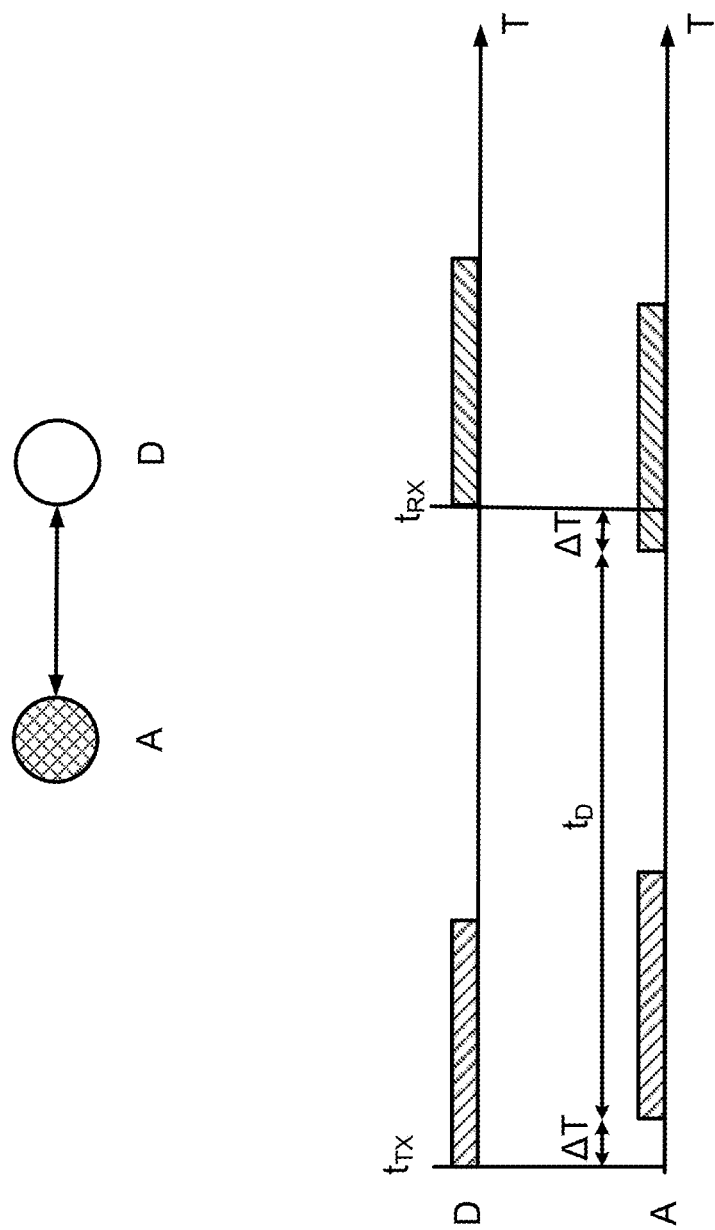
FIG. 4 shows an example of determining the distance between a secondary node and a primary node using the time-of-flight method, according to certain aspects of the present disclosure.

In some examples, the secondary node 204 determines its distance to a particular primary node 202 using a time-of-flight method. FIG. 4 shows an example of determining the distance between a secondary node D and a primary node A using the time-of-flight method, according to certain aspects of the present disclosure. In this method, the secondary node D can initiate the distance determination process by sending a packet to the primary node A. The secondary node D can timestamp the time it sent the packet to the primary node A as $t_{TX}$. The primary node A can be configured to wait for a delay period $t_D$ after receiving the packet and then send a return packet. In some examples, the delay period $t_D$ is pre-determined and known to both the secondary node D and the primary node A. The delay period $t_D$ can be referenced to the start of the packet as shown in FIG. 4.

The secondary node D receives the return packet from the primary node A, and can establish a timestamp $t_{RX}$ to record when the packet was received. Based on the recorded two timestamps and the known delay period, the secondary node D can calculate the time of flight $\Delta T$ as:

$$\Delta T = (t_{RX} - t_D - t_{TX})/2 \quad (1)$$

In some examples, the calculated time of flight $\Delta T$ between the secondary node D and the primary node A is then shared with the primary node A. The secondary node D and the primary node A can save the time of flight as a parameter related to that respective neighboring node (i.e. primary node A stores $\Delta T$ with all the other known information about neighboring node D and vice versa).

The secondary node D further calculates the distance between node D and the primary node A, $d_{AD}$, as:

$$d_{AD} = \Delta T \times c \quad (2)$$

where $c \approx 3 \times 10^8$ m/s and is the speed of light. In addition to the distance, the secondary node D can also calculate the accuracy of the determined distance. Since in the time-of-flight method, the distance is determined based on the time of flight, the accuracy of the calculated distance can be derived from the accuracy of the time. For instance, timing accuracy of ±100 ns leads to a ±30 m accuracy for the calculated distance, and timing accuracy of ±1 us leads to a ±300 m accuracy for the calculated distance.

In some cases, each network node has a known timing accuracy. For example, in the mesh network 140, a clock value is propagated from the root node or a collector node to other nodes. As a result, each node has an absolute time based on the propagation and thus an associated timing accuracy. If the timing accuracy of the secondary node is ±50 ns and the timing accuracy of the primary node is also ±50 ns, then the accuracy of the determined time of flight is ±100 ns (i.e., the summation of the timing accuracies of the two nodes). The accuracy of the calculated distance d is thus ±30 meters. In other examples, the timing accuracy is represented using a relative timing accuracy between pairs of nodes, and in these examples, the accuracy of the distance can be determined by multiplying the relative time accuracy with the speed of light.

It should be understood that the example provided in FIG. 4 is for illustration purposes and should not be construed as limiting. Other similar methods can be used to determine the time-of-flight. For example, the use of a fixed delay period $t_D$ can be eliminated. In this method, the secondary node D can send a packet to the primary node A. The primary node A receives the packet and records the time when it is received at the primary node A. When sending the reply packet, the primary node A transmits the timestamp when the packet was received along with the timestamp when the return packet was sent. The secondary node D can calculate $t_D$ as the difference between these two timestamps. Alternatively, or additionally, the primary node A can be configured to calculate and send the $t_D$ with the reply packet. Note that the packet from the secondary node D to the primary node A and the reply packet from the primary node A to the secondary node D can be any packet, such as a dedicated packet for the distance calculation or data packets for normal communications between these two nodes.

In other examples, the secondary node D can determine its distance to the primary node A based on the signal strength. For instance, the secondary node D can use the received signal strength indicator (RSSI) to determine the distance between two nodes. During normal network operation, the secondary node D receives messages from the neighboring node, the primary node A, and calculates an average RSSI for primary node A. The secondary node D then uses the Friis formula to convert the received signal strength into a distance, if the power and antenna gain of the transmitter are known. The Friis formula can be expressed as:

$$Pr = \frac{Pt * Gt * Gr * c^2}{(4\pi * d * f)^2}, \quad (3)$$

where Pt is the transmit power (measured in Watts), Pr is the received power (measured in Watts), c is the speed of light (~$3 \times 10^8$ m/s), Gt is the gain of transmit antenna, Gr is the gain of receive antenna, f is the frequency (measured in Hz), and d is the distance between the two nodes (measured in meters). Using this formula, the distance d can be determined as:

$$d = \frac{\sqrt{\frac{Pt}{Pr} * Gt * Gr * c^2}}{(4*\pi*f)^2} = \frac{c*\sqrt{\frac{Pt}{Pr} * Gt * Gr}}{4*\pi*f}. \quad (4)$$

In some examples, to correct for phenomena that are not considered in this formula, such as ground bounce, a correction factor can be empirically established for specific nodes and applied to the formula.

In addition to the distance, the secondary node D can be further configured to determine the accuracy of the distance determined using the RSSI. The factors that impact the received RSSI accuracy include, but are not limited to, the actual output power (which may have an accuracy of ±1 dB), the antenna patterns of both antennas and relative angles, the RSSI accuracy measurement of the receiver, multipath characteristics of the RF signal, and others. The accuracies of these factors can be added up to determine the accuracy of the determined distance. The secondary node can further convert the RSSI accuracy to distance accuracy or error. In an example, for an overall RSSI accuracy of ±2 dB, the distance error is approximately 26% of the calculated distance. Therefore, if the RSSI accuracy is known to be less than or equal to 2 dB and the calculated distance is 1000 feet, the distance error is ±260 feet. Based on the distance error, if the secondary node determines that the accuracy of the RSSI method is not enough to meet the requirements for the location determination, the secondary node can discard the distance determined using the RSSI method and use another method to determine the distance.

It is noted that compared with the time-of-flight method, one advantage of the RSSI distance method is that the RSSI method does not require the primary node and the secondary node to be on the same network. It only requires that these two nodes are able to share location (e.g., through a command center such as the headend system) and are within the communication range of each other. As such, the RSSI method can also be used when the primary node and the secondary node are on different networks. For instance, the primary node can send its location information to the command center and the secondary node can obtain such location information from the command center. The secondary node then using the RSSI method to determine the distance between these two nodes. Using the location and distance information, along with the location and distance information for other primary nodes, the secondary node is able to determine its location as discussed above.

In addition, if the primary node and the secondary node whose distance is to be determined are further away, the RSSI method is less accurate than the time-of-flight method. If these two nodes are closer, the RSSI method is more accurate than the time-of-flight method. As such, in some implementations, the secondary nodes can be configured to implement both methods and choose the proper method according to factors such as the distance between the two nodes. In some examples, both methods can be used to calculate the distance, and results are compared and combined to determine the output distance.

Referring back to FIG. 3, at block 310, the secondary node 204 determines its location and the associated location accuracy. For instance, the secondary node 204 can determine its location using three selected in-range primary nodes as reference nodes via the triangulation method. The determination can be based on its distance to each of the three nodes as determined at block 308. More specifically, the location is determined by finding the intersection of three circles. Each circle is associated with one of the three in-range primary nodes and defined as follows: the center of the circle is the location of the in-range primary node; the radius is the determined distance between the in-range primary node and the secondary node.

If the secondary node 204 selects more than the required number of in-range primary nodes at block 306, the secondary node 204 determines a candidate location for each candidate set of in-range primary nodes using the distances from the corresponding primary nodes. For each calculated location or candidate location, the secondary node 204 further calculates an accuracy associated with the location. If the location is calculated using the triangulation method described above, the worst-case accuracy of the location of the secondary node can be approximated by averaging the sums of the accuracy of the three primary nodes used to determine the location plus the accuracy of each distance measurement. In the example shown in FIG. 2, primary nodes A, B, C are used to determine the location of secondary node D. Denote the location accuracy associated with the three primary nodes as ±Error(A), ±Error(B), and ±Error(C). Error(A) (or −Error(A)), Error(B) (or −Error(B)), and Error (C)(or −Error(C)) are the worst-case errors in location. Further denote the absolute values of the errors in the distance measurement for the distances between node D and nodes A, B, C as DistError(A), DistError(B), DistError(C), respectively. The location accuracy of the secondary node D can be determined as the ±⅓(Error(A)+DistError(A)+Error(B)+DistError(B)+Error(C)+DistError(C)).

If there are multiple candidate locations being calculated, the secondary node 204 then combines these candidate locations according to their accuracies. In one example, the secondary node 204 generates a weighted summation of these candidate locations with the weights being determined based on the accuracies. The output of the weighted summation can be used as the location of the secondary node 204. For example, the location can be determined as a weighted average of the candidate locations. The weighting factor for a candidate location can be determined as the inverse of the location accuracy of the candidate location divided by the sum of the inverses of location accuracies of the candidate locations. The accuracy of the determined location can be calculated based on the inverse of the sum of the inverses of the location accuracies. This can be mathematically expressed as:

$$Loc = \sum_{i=1}^{n} w_i \times CandLoc_i, \quad (5)$$

$$w_i = \frac{1/\text{Error }(i)}{\sum_{j=1}^{n}\frac{1}{\text{Error }(j)}}, \quad (6)$$

$$\text{Error }(Loc) = \frac{1}{\sum_{j=1}^{n}\frac{1}{\text{Error }(j)}}, \quad (7)$$

where n is the number of candidate locations. $\text{CandLoc}_i$ is the i-th candidate location represented as a vector containing the x and y coordinates (i.e., the longitude and latitude values) of the i-th candidate location, $w_i$ is the weighting factor for i-th candidate location, and Error(i) is the absolute value of the location accuracy for the i-th candidate location. Loc is the determined location for the secondary node and is a vector containing the x and y coordinates of the location, and Error(Loc) is the absolute value of the location accuracy for the determined location. In other words, the location accuracy of the determined location Loc is ±Error(Loc).

At block 312, the secondary node 204 transmits the determined location and the location accuracy to the headend system over the mesh network 140 so that the location of the secondary node 204 is recorded. In some examples, the secondary node 204 may detect that one or more primary nodes have inaccurate locations. For instance, the secondary node 204 receives conflicting data from different primary nodes. The secondary node 204 can generate a flag for the conflicting data and transmit the flag to the headend system to resolve the conflict. Further, as discussed above, after the location of the secondary node 204 is determined, the secondary node 204 may become a primary node. In that case, the secondary-node-turned primary node 204 is configured to change its primary node identifier to true and send its location information to other secondary nodes upon request.

The above methods for determining the distance between two nodes and the location of a node using these distances can also be utilized to determine the relative locations between secondary nodes. These relative locations can then be utilized to generate the relative map for a group of secondary nodes as discussed above.

Note that in the example shown in FIG. 3, the accuracy of the location determined for the secondary node 204 is lower than that of the primary node due to error propagation. Likewise, when the secondary node 204 becomes a primary node, the accuracy of the location of another secondary node determined based on the secondary node 204 is further reduced due to the further error propagation. In contrast, if the locations of the secondary nodes are determined by building a relative map and then finalizing the locations when a sufficient number of primary nodes are available, the accuracies of the locations are the same for all the secondary nodes in the relative map.

In some implementations, the network nodes in the mesh network 140 are configured to update their locations periodically. As such, the above process for location determination is repeated by the network nodes periodically. This can help to improve the location accuracy of the network nodes.

Exemplary Meter

Figure 5:
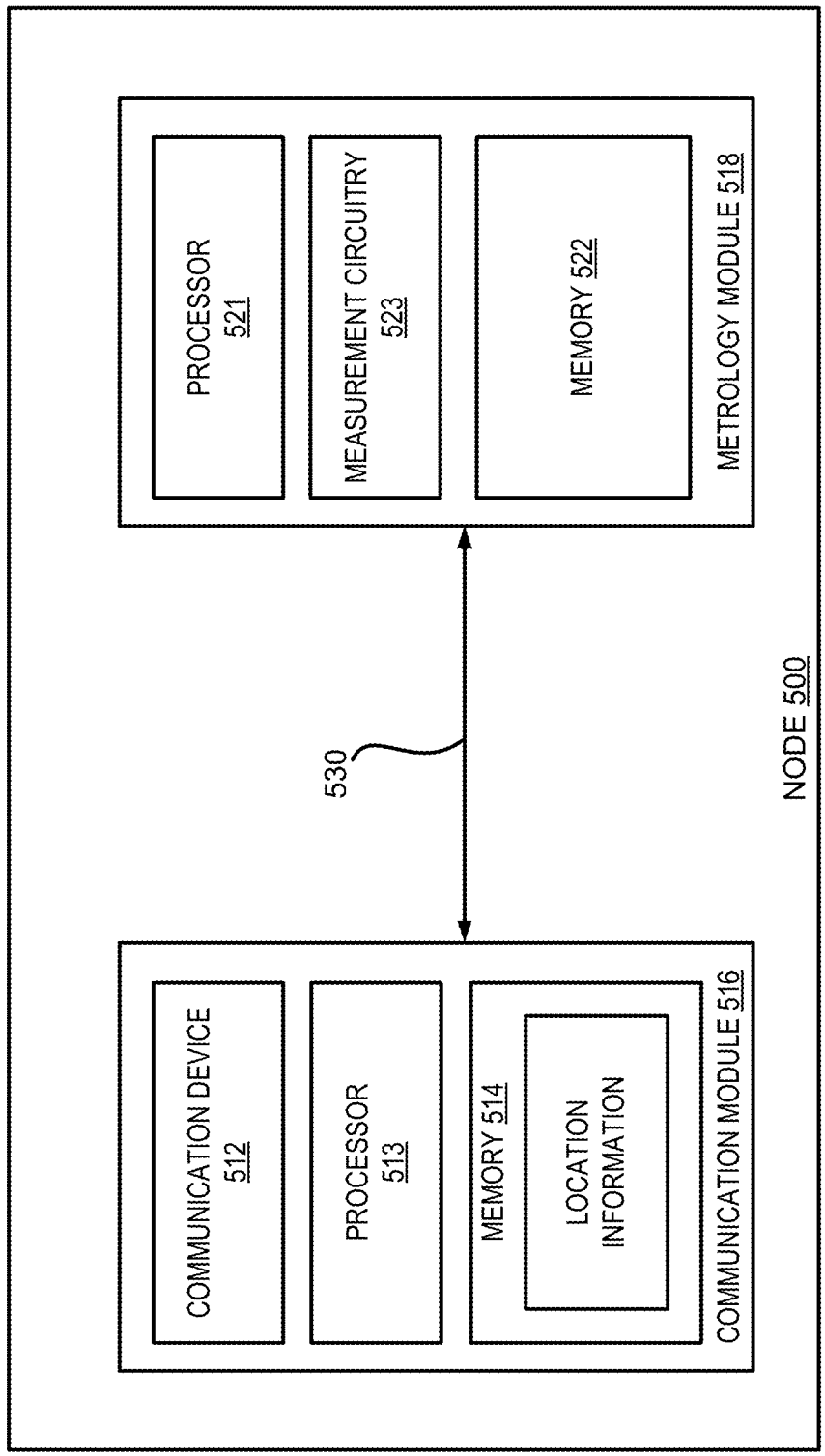
FIG. 5 is a block diagram depicting an example of a node suitable for implementing aspects of the techniques and technologies presented herein.

FIG. 5 illustrates an exemplary node 500 that can be employed to implement the autonomous location determination described herein, such as a node 112, a root node 114, or another node in the mesh network whose location is to be determined. The node 500 includes a communication module 516 and a metrology module 518 connected through a local or serial connection 530. These two modules may be housed in the same unit on separate boards hence the local connection 530 may be an onboard socket. Alternatively, the modules may be housed separately and thus the local connection 530 may be a communication cable, such as a USB cable, or another conductor.

The function of the communication module 516 includes sending communication data 122 and other data to other nodes in the mesh network 140 and receiving data from the other meters or nodes in the mesh network 140. The function of the metrology module 518 includes the functions necessary to manage the resource, in particular, to allow access to the resource and to measure the resource used. The communication module 516 may include a communication device 512 such as an antenna and a radio. Alternatively, the communication device 512 may be any device that allows wireless or wired communication. The communication module 516 may also include a processor 513, and memory 514. The processor 513 controls functions performed by the communication module 516. The memory 514 may be utilized to store data used by the processor 513 to perform its function. The memory 514 may also store other data for the node 500 such as the location information.

The metrology module 518 may include a processor 521, memory 522, and measurement circuitry 523. The processor 521 in the metrology module 518 controls functions performed by the metrology module 518. The memory 522 stores data needed by the processor 521 to perform its functions and other data generated. The communication module 516 and the metrology module 518 communicate with each other through the local connection 530 to provide data needed by the other module. The measurement circuitry 523 handles the measuring of the resource and may be used as the sensor to collect sensor data. Both the communication module 516 and the metrology module 518 may include computer-executable instructions stored in memory or in another type of computer-readable medium and one or more processors within the modules may execute the instructions to provide the functions described herein.

It should be understood that the node 500 shown in FIG. 5 is merely an example and should not be construed as limiting. Other type of network nodes may also be configured to implement the location determination presented herein. For example, a network node in the mesh network may be a device without a metrology module. In those scenarios, the node can include at least a processor for performing the functions of determining the location of the node as described herein. The node can further include a non-transitory computer-readable storage medium for storing data needed by the processor to perform its functions and other data generated by the processor, such as the location information, the distance information, and so on. The node may further include a communication device that allows wireless or wired communication of at least the location information and other data to another device.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system for determining a geographical location of a node in a wireless mesh network, comprising:
   a plurality of nodes communicatively connected through a wireless mesh network, wherein the plurality of nodes comprise a group of primary nodes whose geographical location are known and a group of secondary nodes whose geographical locations are to be determined, and wherein a secondary node in the group of secondary nodes is configured to perform operations comprising:
   identifying in-range primary nodes for the secondary node among the group of primary nodes that are in a communication range of the secondary node;
   determining that a number of the in-range primary nodes is above a threshold;
   in response to determining that a number of the in-range primary nodes is above the threshold,
      determining a physical distance between the secondary node and each of at least three in-range primary nodes;
      calculating a geographical location of the secondary node based on the physical distances between the secondary node and the at least three in-range primary nodes and the respective geographical locations of the at least three in-range primary nodes; and
      transmitting data specifying the calculated geographical location to a headend system over the wireless mesh network;
   wherein the at least three in-range primary nodes comprise more than three in-range primary nodes, and
   wherein calculating a geographical location of the secondary node based on the physical distances between the secondary node and at least three in-range primary nodes comprises:
      determining a plurality of subsets of three in-range primary nodes from the at least three in-range primary nodes;
      for each subset of three in-range primary nodes, calculating a candidate location of the secondary node based on the physical distances between the secondary node and the three in-range primary nodes; and
      calculating the geographical location of the secondary node by applying a weighted summation of the candidate locations of the secondary node.

2. The system of claim 1, wherein the operations further comprise:
   calculating a location accuracy associated with the calculated geographical location of the secondary node based, at least in part, upon location accuracies of the respective geographical locations of the at least three in-range primary nodes; and
   transmitting the calculated location accuracy along with the calculated geographical location to the headend system.

3. The system of claim 2, wherein the operations further comprises:
   transmitting data specifying the calculated geographical location and the calculated location accuracy to another secondary node in the group of secondary nodes.

4. The system of claim 1, wherein the operations further comprise determining the at least three in-range primary nodes by selecting, among the in-range primary nodes, at least three in-range primary nodes whose geographical locations having location accuracies higher than other in-range primary nodes.

5. The system of claim 1, wherein determining the physical distance between the secondary node and an in-range primary node is performed using a time-of-flight method.

6. The system of claim 1, wherein determining the physical distance between the secondary node and an in-range primary node is performed based on a strength of a signal received at the secondary node from the in-range primary node.

7. The system of claim 1, wherein the operations further comprise, in response to determining that a number of the in-range primary nodes is not above the threshold:
   determining a physical distance between the secondary node and each of at least three in-range secondary nodes, wherein the at least three in-range secondary nodes are among the group of secondary nodes and are in the communication range of the secondary node;
   calculating a relative location of the secondary node with respect to the at least three in-range secondary nodes based on the physical distances between the secondary node and the at least three in-range secondary nodes; and
   transmitting the relative location of the secondary node to a node in the wireless mesh network.

8. The system of claim 1, wherein a primary node is one or more of:

a node whose geographical location is determined using a GPS chip installed in the node;

a node whose geographical location is determined using a Wi-Fi component of the node;

a node whose geographical location is determined using a cellular modem of the node;

a node whose geographical location is determined using locations of other primary nodes; or a node whose geographical location is converted from an address associated with the node.

9. The system of claim 1, wherein a primary node in the group of primary nodes is configured for transmitting, in a network message, location information of the primary node to the secondary node, the location information of the primary node comprising a geographical location of the primary node and location accuracy associated with the geographical location.

10. A method performed by a node in a wireless mesh network for determining a geographical location of the node, the method comprising:
 determining in-range primary nodes for the node that are in a communication range of the node, wherein geographical locations of the in-range primary nodes are known;
 receiving respective location information of the in-range primary nodes from the corresponding in-range primary nodes, the location information specifying the respective geographical locations of the in-range primary nodes;
 determining that a number of the in-range primary nodes is above a threshold;
 in response to determining that a number of the in-range primary nodes is above a threshold,
  determining a physical distance between the node and each of at least three in-range primary nodes;
  calculating a geographical location of the node based on the physical distances between the node and the at least three in-range primary nodes and the respective geographical locations of the at least three in-range primary nodes; and
  transmitting data specifying the calculated geographical location to a headend system over the wireless mesh network;
 wherein the at least three in-range primary nodes comprise more than three in-range primary nodes, and
 wherein calculating a geographical location of the node based on the physical distances between the node and at least three in-range primary nodes comprises:
  determining a plurality of subsets of three in-range primary nodes from the at least three in-range primary nodes;
  for each subset of three in-range primary nodes, calculating a candidate location of the node based on the physical distances between the node and the three in-range primary nodes; and
  calculating the geographical location of the node by applying a weighted summation of the candidate locations of the node.

11. The method of claim 10, further comprising:
 calculating a location accuracy associated with the calculated geographical location of the node based, at least in part, upon location accuracies of the respective geographical locations of the at least three in-range primary nodes; and
 transmitting the calculated location accuracy along with the data specifying the calculated geographical location to the headend system.

12. The method of claim 10, further comprising determining the at least three in-range primary nodes by selecting, among the in-range primary nodes, at least three in-range primary nodes having accuracies higher than other in-range primary nodes.

13. The method of claim 10, wherein determining the physical distance between the node and an in-range primary node is performed using at least one of a time-of-flight method or a signal-strength-based method based on a strength of a signal received at the node from the in-range primary node.

14. The method of claim 10, further comprising, in response to determining that a number of the in-range primary nodes is not above the threshold:
 determining a physical distance between the node and each of at least three in-range secondary nodes, wherein the at least three in-range secondary nodes are in the communication range of the node and geographical locations of the at least three in-range secondary nodes are to be determined;
 calculating a relative location of the node with respect to the at least three in-range secondary nodes based on the physical distances between the node and the at least three in-range secondary nodes; and
 transmitting data specifying the relative location of the node to another node in the wireless mesh network.

15. A node in a wireless mesh network, comprising:
 a processor configured to execute computer-readable instructions; and
 a memory configured to store the computer-readable instructions that, when executed by the processor, cause the processor to perform operations comprising:
  determining in-range primary nodes for the node that are in a communication range of the node, wherein geographical locations of the in-range primary nodes are known;
  receiving respective location information of the in-range primary nodes from the corresponding in-range primary nodes, the location information specifying the respective geographical locations of the in-range primary nodes;
  determining that a number of the in-range primary nodes is above a threshold;
  in response to determining that a number of the in-range primary nodes is above a threshold,
   determining a physical distance between the node and each of at least three in-range primary nodes;
   calculating a geographical location of the node based on the physical distances between the node and the at least three in-range primary nodes and the respective geographical locations of the at least three in-range primary nodes; and
   transmitting data specifying the calculated geographical location to a headend system over the wireless mesh network;
  wherein the at least three in-range primary nodes comprise more than three in-range primary nodes, and
  wherein calculating a geographical location of the node based on the physical distances between the node and at least three in-range primary nodes comprises:

determining a plurality of subsets of three in-range primary nodes from the at least three in-range primary nodes;

for each subset of three in-range primary nodes, calculating a candidate location of the node based on the physical distances between the node and the three in-range primary nodes; and calculating the geographical location of the node by applying a weighted summation of the candidate locations of the node.

16. The node of claim 15, wherein the operations further comprise:

calculating a location accuracy associated with the calculated geographical location of the node; and transmitting the calculated location accuracy along with the data specifying the calculated geographical location to the headend system.

17. The node of claim 15, wherein determining the physical distance between the node and an in-range primary node is performed using at least one of a time-of-flight method or a signal-strength-based method based on a strength of a signal received at the node from the in-range primary node.

18. The node of claim 15, wherein a primary node is one or more of:

a node whose geographical location is determined using a GPS chip installed in the node;

a node whose geographical location is determined using a Wi-Fi component of the node;

a node whose geographical location is determined using a cellular modem of the node;

a node whose geographical location is determined using locations of other primary nodes; or a node whose geographical location is converted from an address associated with the node.

* * * * *